United States Patent [19]

Kruse et al.

[11] 4,003,519
[45] Jan. 18, 1977

[54] TRAVELING IRRIGATION SPRINKLER

[75] Inventors: Frederick V. Kruse, Kilbourne;
Deane O. Behrends, Havana, both of Ill.

[73] Assignee: AG-Rain Incorporated, Havana, Ill.

[22] Filed: Apr. 8, 1976

[21] Appl. No.: 675,169

[52] U.S. Cl. .............................. 239/183; 239/189;
239/191; 239/195; 242/86.5 R
[51] Int. Cl.² .......................................... B05B 3/18
[58] Field of Search ...................... 239/178–181,
239/183–185, 189, 191, 192, 195–199;
137/344; 242/86.5 R, 54 R, 86.2

[56] References Cited
UNITED STATES PATENTS

| | | | |
|---|---|---|---|
| 2,249,211 | 7/1941 | Johnson | 239/183 |
| 3,628,731 | 12/1971 | Phillips | 239/191 X |
| 3,684,178 | 8/1972 | Friedlauder | 242/86.5 R X |
| 3,771,720 | 11/1973 | Courtright | 239/191 X |
| 3,841,561 | 10/1974 | Lacey | 239/189 |
| 3,848,805 | 11/1974 | Courtright | 239/189 |

*Primary Examiner*—Robert S. Ward, Jr.

[57] ABSTRACT

A traveling irrigation sprinkler has a water-powered radial inflow turbine for driving a winch that pulls the sprinkler along a path of travel. Water is supplied to a sprinkler gun either directly from an inlet conduit, or indirectly by passing it through the turbine. A diverter valve proportions the direct and indirect flows and provides a first means of controlling the travel speed of the sprinkler. A shiftable transmission drivingly interconnects the turbine and the winch and provides a second means of controlling travel speed. The turbine includes a vaned runner and a scroll which circumferentially surrounds the runner to deliver water at a substantially uniform velocity to the periphery of the runner.

12 Claims, 9 Drawing Figures

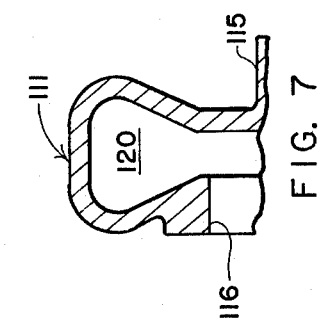
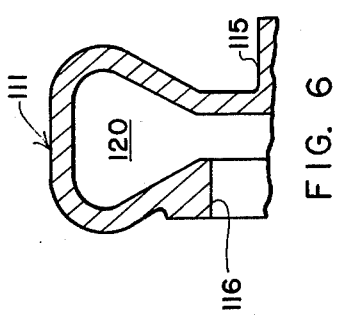
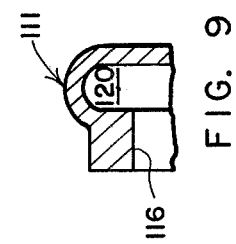
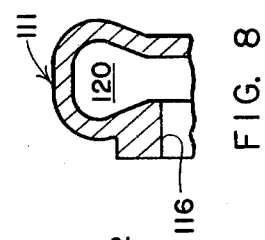
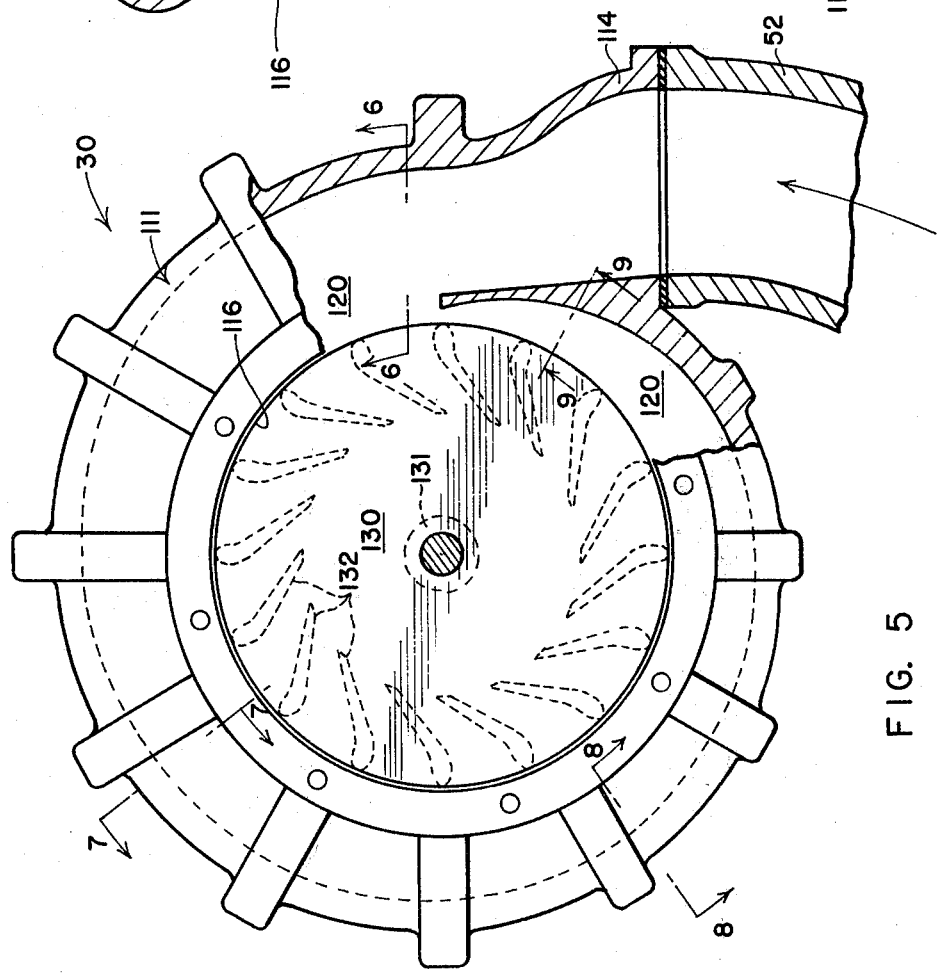

TRAVELING IRRIGATION SPRINKLER

BACKGROUND OF THE INVENTION

1. Field of the Invention

The present invention relates generally to automated sprinkler irrigation systems, and more particularly to a fluid driven traveling sprinkler unit.

2. Prior Art

Traveling sprinkler units, called "travelers," are widely used in the irrigation of grain crops, tree crops, vegetables, pasture, sod and the like. A typical traveler includes a frame supported on forward and rearward wheels. A power driven winch is carried on the frame and pulls the unit across a field by reeling in a cable. The cable has one end anchored at one end of a predetermined path of travel or "cable path" to be followed by the unit. A steering gear guides the forward wheels to follow the cable path. The unit carries a riser pipe for supplying pressurized water to a rotating sprinkler head mounted atop the riser pipe. As the unit travels along the cable path, the sprinkler head rotates to distribute irrigation water in a predetermined radius around the unit.

Some travelers carry internal combustion engines to drive the winch. Others use water powered reciprocating pistons. Still others drive the winch with a water powered turbine. A transmission is interposed between the winch drive and the drum which reels in cable to provide a range of selectable travel speeds. Travel speed determines the amount of water applied to a field as the unit moves along a cable path.

Pressurized water is supplied to a traveler through a long length of flexible hose. Hoses used with travelers typically have a length within the range of about 500 to 660 feet, and a diameter within the range of about 2 ½ to 5 inches. The hose trails along behind the traveler as the traveler traverses a cable path. Drag forces imposed on the traveler by the hose help keep the drive cable taut.

The length of a cable path which can be traversed by a traveler is determined by the length of the supply hose. Cable path length is maximized in usual practice by providing the hose supply header connection near the midpoint of the cable path. During the first half of the travelers' movement along a cable path, the traveler moves toward the supply header. It then passes by the supply header and moves away from the header during the second half of its movement along the cable path. Maximum cable path length attainable with this system is about twice the length of the supply hose.

Two opposing factors operate to influence the speed of movement of a traveler as it traverses a cable path. The first is an increase in the effective diameter of the winch drum as more and more cable is wound onto the drum. This effect tends to increase the speed of travel of the unit as more and more cable is reeled in by the winch.

The second factor is increasing drag force load imposed on the traveler as the length of hose being dragged increases. This factor tends to decrease travel speed as the unit progresses along a cable path. When the traveler is initially positioned at one end of a cable path, the supply hose is laid out behind the traveler for a distance of 20 or 30 feet, then makes a wide radius U-turn, and extends forwardly along one side of the cable path for connection to the supply header. When the traveler starts moving along the cable path, it must drag only about 20 or 30 feet of water filled hose. When the traveler reaches a midpoint along the cable path, it is then dragging about half the length of the supply hose. As the traveler approaches the end of the cable path, it is dragging nearly the full length of the supply hose. The range of hose drag force loadings imposed on a traveler extends from only a few pounds at the outset of traveler movement to several thousands of pounds as the traveler approaches the end of a cable path. A 5 inch diameter water filled hose 660 feet long typically imposes about a 5,500 pound load on the traveler as the traveler nears the end of a cable path.

Designing a suitable drive system to power the winch of a traveling sprinkler unit poses several unique challenges. The drive must have a sufficient capacity to be able to accommodate drag force loadings of several tons. The drive must be able to maintain a substantially constant travel speed despite the tendency of increasing effective cable drum diameter to increase travel speed, and despite the tendency of increasing hose drag force loads to significantly reduce travel speed. Moreover, the drive should be light in weight, simple in construction, and should require minimal maintenance.

While internal combustion engines have been used on some travelers to power the winch, they add significantly to the weight of the traveler, require a separate fuel supply, are expensive to purchase and maintain, and often become quite temperamental with age.

Water powered reciprocating piston drives have the disadvantage of requiring a heavy duty ratchet linkage that must carry high loads and is subject to severe wear. Piston drives are relatively heavy, complex and costly, and require some auxiliary means of disposing of the water used to power them.

Turbine drives have the advantages of being substantially lighter in weight, simpler in construction and less expensive to operate and maintain. Moreover, the water used to power a turbine drive requires no separate means of disposal.

Axial flow turbines proposed for use in traveler winch drive systems have the disadvantage of providing an increasing resistance to fluid flow as their speed of operation slows. Stated in another way, axial flow turbines decrease in efficiency as the load imposed on them increases. This characteristic is opposite to that which is needed in a traveling sprinkler unit if travel speed is to be maintained despite significantly increasing hose drag loads. Still another problem with axial flow turbines is that they provide a relatively low torque, high speed output that is not well suited for traveler application.

One traveler drive proposal uses a radial inflow turbine to power the traveler's winch. In this proposal, the turbine has no "scroll," i.e., no housing portion which defines a spiral waterway of decreasing cross section which converges on the turbine wheel or "runner." Without a scroll, water admitted to the runner differs in velocity depending on the sector of the turbine volute from which it is admitted to the runner. The efficiency obtainable with such a turbine is much lower than desired and the torque output attainable is undesirably low.

A problem common to all previously proposed traveler winch drive systems is that they have not responded properly to increasing drag forces and to increasing effective winch drum diameter to maintain substantially constant travel speeds. Other problems include the inability of previously proposed drives to cope with wide variations in flow rates and torque output requirements that are encountered in different sprinkler installations. Still another drawback of proposed drive systems is their failure to provide an easy means of changing the drive ratio to provide a wide range of travel speeds in any given sprinkler installation.

SUMMARY OF THE INVENTION

The present invention overcomes the foregoing and other drawbacks of the prior art and provides a novel and improved fluid driven traveling irrigation sprinkler.

A feature of the present invention is its use of a scrolled radial inflow turbine to drive a winch for moving the unit along a cable path. A radial inflow turbine characteristically provides a high torque, relatively low speed output, and this type of output is ideal for use in travelers.

Another characteristic of radial inflow turbines is that they have a given operating speed where their efficiency is maximized. As operating speed approaches this given speed, turbine efficiency increases. The present invention utilizes this characteristic to provide a winch drive system that increases in efficiency, i.e., increases torque output, as the turbine is slowed by increasing hose drag loading. The turbine accordingly seeks to maintain a substantially constant drive speed as drag force increases.

In preferred practice, the radial inflow turbine has a scroll which surrounds the turbine runner and which provides an inlet chamber that decreases in cross-section as it extends around the runner from the region of the turbine inlet. The scroll helps to assure that water is delivered at a substantially uniform velocity to the periphery of the runner. Such a scroll increases the efficiency of the turbine and permits it to provide a higher torque output than is obtainable with turbine housing configurations used on other travelers.

Still another feature of the present invention is its use of a diverter valve to control the proportion of pressurized water which is either ducted directly to a sprinkler gun or indirectly to the gun through the radial inflow turbine. By proportioning these direct and indirect flows, the diverter valve provides a first means of controlling the travel speed of the sprinkler unit.

A shiftable transmission drivingly connects the turbine and the winch, and provides a second means of controlling travel speed. The settings of these two speed control systems are coordinated to provide substantially constant, desired travel speeds. If the sprinkler unit is found to be increasing its speed as it moves along a cable path, this is corrected by shifting the transmission to a higher gear and reducing the flow of water through the turbine. If the sprinkler unit is found to be decreasing its speed as it moves along a cable path, this is remedied by shifting to a lower gear and increasing the flow of water through the turbine. The provision of these two types of speed control systems permits one to obtain a desired and constant travel speed in almost any type of sprinkler installation regardless of water pressure, terrain, and other variables.

It is a general object of the present invention to provide a novel and improved traveling irrigation sprinkler.

Other objects and a fuller understanding of the invention may be had by referring to the following description and claims taken in conjunction with the accompanying drawings.

BRIEF DESCRIPTION OF THE DRAWINGS

FIG. 5 is a front elevational view of a radial inflow turbine employed in the irrigation apparatus with portions of the turbine removed and shown in cross section; and, FIGS. 6, 7, 8 and 9 are sectional views as seen from planes indicated by lines 6—6, 7—7, 8—8 and 9—9 in FIG. 5.

DESCRIPTION OF THE PREFERRED EMBODIMENT

Figures 1, 2:
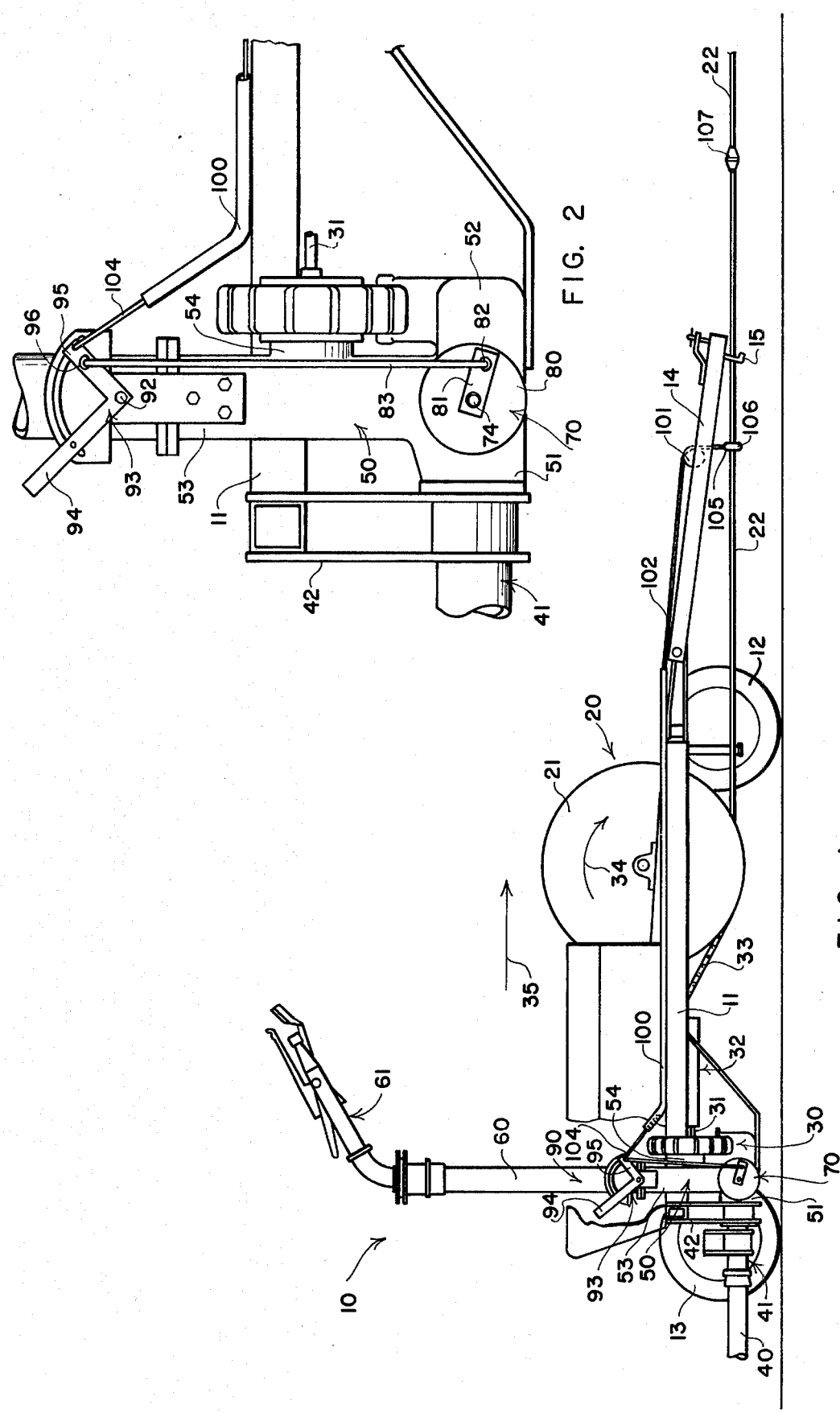
FIG. 1 is a side elevational view of an irrigation apparatus embodying the present invention with portions of the apparatus removed and broken away.
FIG. 2 is an enlarged side elevational view of a portion of the irrigation apparatus.

Referring to FIG. 1, a traveling irrigation sprinkler unit is indicated generally by the numeral 10. The unit 10 includes a frame assembly 11 supported on pairs of forward and rearward ground engaging wheels 12, 13. A conventional steering gear assembly including a tongue 14 connects with the front wheels 12 and guides the movement of the unit 10. A cable guide bracket 15 depends from the tongue 14 to guide the unit 10 along a cable path, as will be explained.

A winch 20 is carried on the frame assembly 11. The winch 20 includes a cable take-up drum 21 and a cable 22. One end region of the cable 22 is reeved around the drum 21. The remainder of the cable 22 extends forwardly from the drum 21 through the cable guide bracket 15, and defines a path of travel or "cable path" for the unit 10 to follow. The forward end (not shown) of the cable 22 is anchored at one end of the cable path.

A water powered turbine 30 operates the winch 20. The turbine 30 has an output shaft 31 which connects with a conventional transmission assembly 32. The transmission assembly 32 is provided with a means to select the ratio of its input and output speeds to control the travel speed of the unit 10. A roller chain 33 drivingly connects the transmission assembly 32 and the cable take-up drum 21. When the turbine 30 and the transmission assembly 32 drive the drum 21 in the direction indicated by an arrow 34, the cable 22 is wound on to the drum 21 causing the unit 10 to move forwardly as indicated by an arrow 35. As the unit 10 moves forwardly, the cable guide bracket 15 follows the cable path and steers the tongue 14 to keep the unit 10 moving in a desired direction.

Pressurized irrigation water is supplied to the unit 10 through a flexible hose 40. The hose 40 typically has a length within the range of about 500 to 660 feet, and a diameter within the range of about 2 ½ to 5 inches. A hose connection conduit assembly 41 establishes a secure connection with the hose 40. A mounting bracket 42 depends from the frame assembly 11 and rigidly supports the conduit assembly 41 to transmit hose drag forces from the conduit assembly 41 to the frame assembly 11.

Referring to FIGS. 1 and 2, a diverter valve housing 50 has a rearwardly extending branch 51 which connects with the conduit assembly 41. The housing 50 has a forwardly extending branch 52 which turns upwardly at a location beneath the turbine 30 for admitting pressurized water to the scroll of the turbine 30, as will be described. The valve housing 50 also has an upstanding branch 53. A branch 54 communicates the upstanding branch 53 and a central portion of the housing of the turbine 30, as will be described.

Referring again to FIG. 1, a riser pipe 60 is supported atop the diverter valve housing 50. A conventional rotating sprinkler gun 61 is carried atop the riser pipe 50. Pressurized irrigation water is ducted upwardly from the housing branch 53 through the riser pipe 60 and through the sprinkler gun 61 for distribution over a predetermined area surrounding the unit 10.

Figure 4:
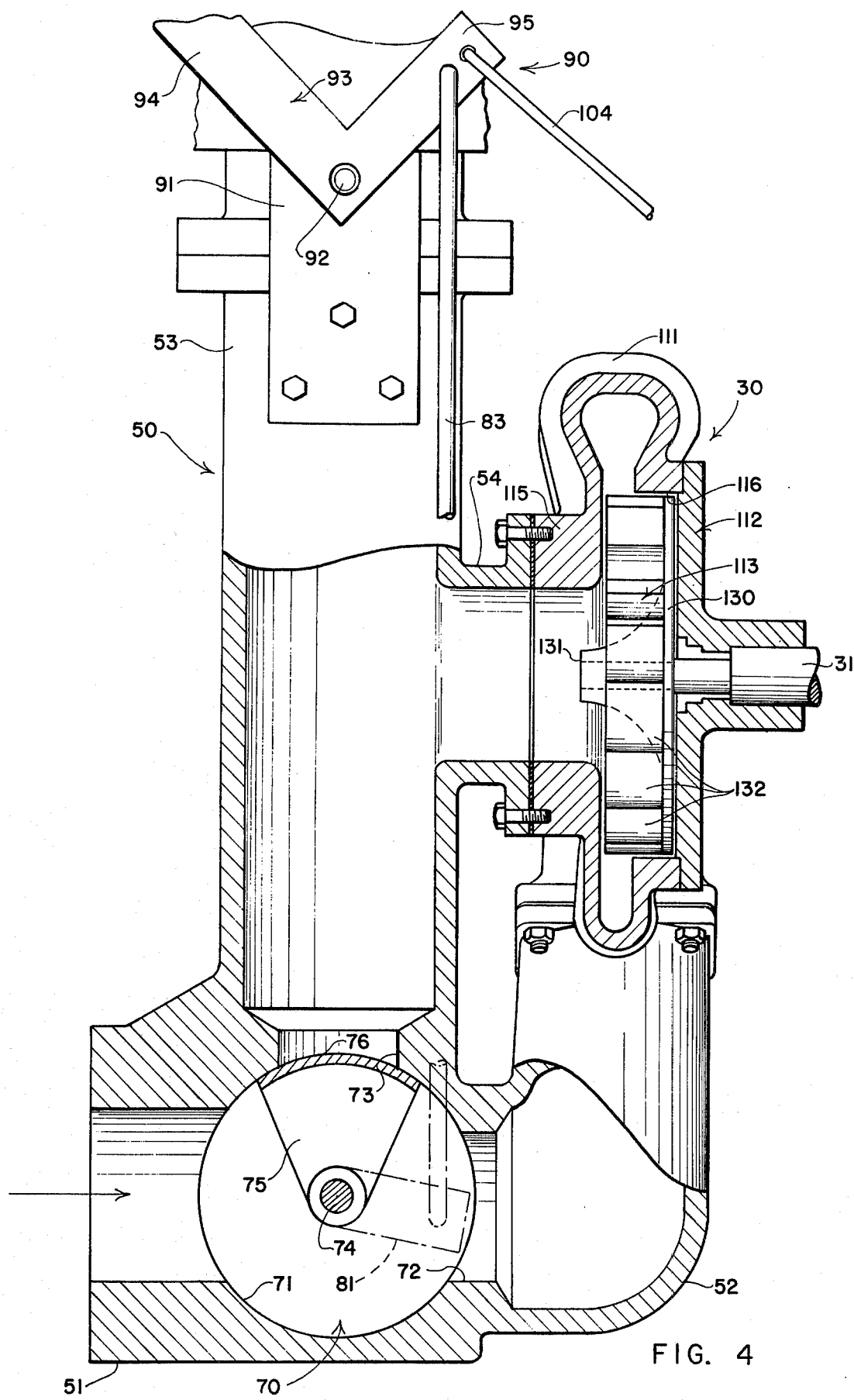
FIG. 4 is a view, partially in cross-section, as seen from planes indicated by a broken line 4—4 in FIG. 3.

A diverter valve 70 is provided at the juncture of the housing branches 51, 52, 53 for deflecting pressurized irrigation water from the branch 51 selectively into the branches 52, 53. Referring to FIG. 4, a cylindrical bore 71 is provided in the housing 50 at the juncture of the branches 51, 52, 53. One end of the bore 71 opens through a sidewall of the housing 50, and the other end is closed by an opposite sidewall of the housing 50. The branches 52, 53 have inlet openings 72, 73 which open at circumferentially spaced locations through the wall of the cylindrical bore 71. A shaft 74 extends coaxially through the bore 71 and is journaled at one end by the housing 50. A valve element 75 is mounted on the shaft 74 for rotation with the shaft 74. The valve element 75 has an arcuately curved peripheral surface 76 which can be positioned to selectively close either of the openings 72, 73, or to selectively close portions of both of the openings 72, 73.

Figure 3:
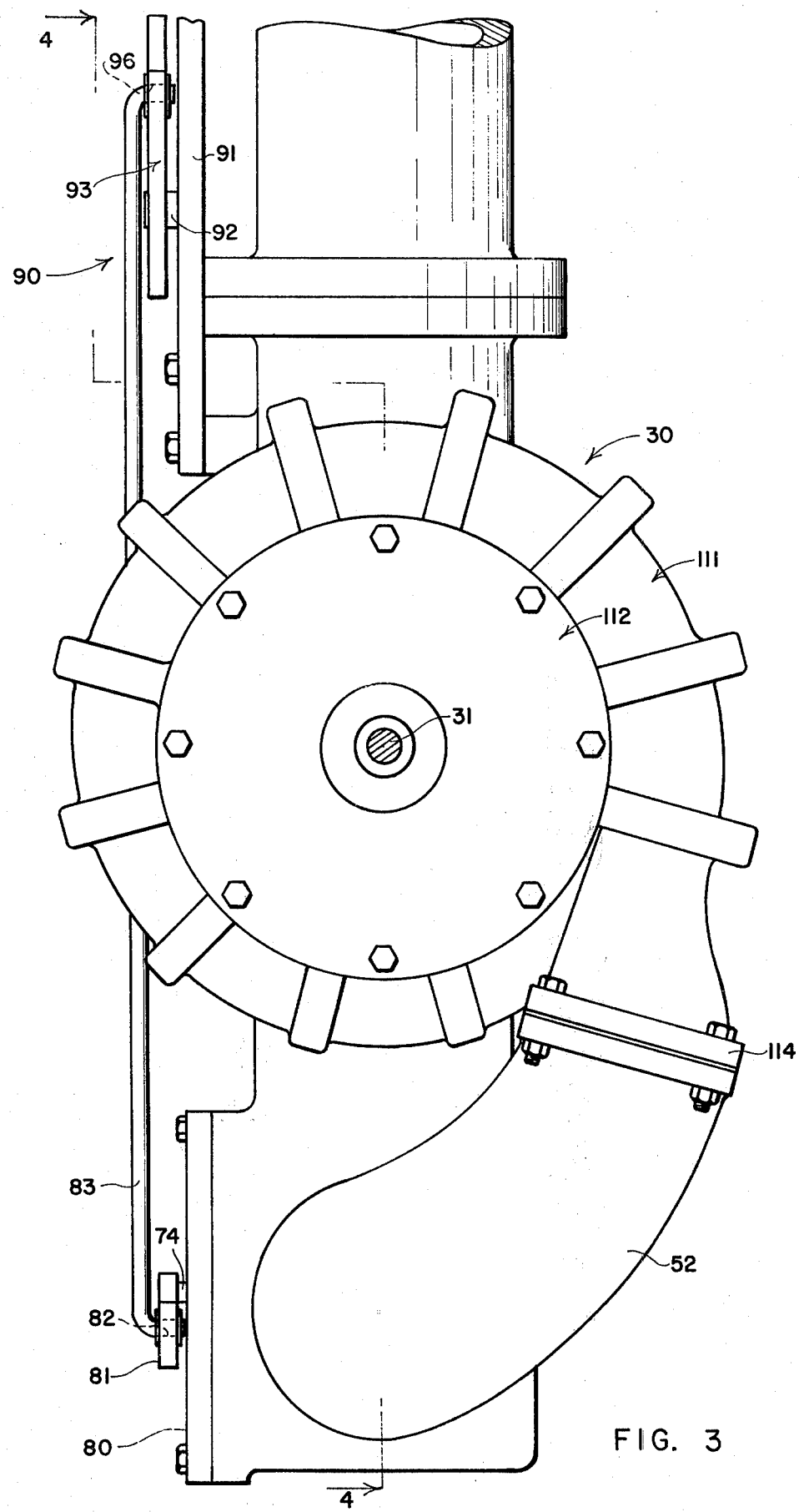
FIG. 3 is an enlarged front elevational view of a portion of the irrigation apparatus.

Referring to FIG. 3, a cover plate 80 closes the open end of the cylindrical bore 71. The shaft 74 extends through and is journaled by the cover plate 80. A positioning lever 81 connects with the outer end of the shaft 74. Referring to FIGS. 2 and 3, a hole 82 is formed through the positioning lever 81. A connection rod 83 has its lower end journaled in the hole 82.

Referring to FIGS. 3 and 4, a control lever assembly 90 is supported on the upper end region of the housing branch 53. The control lever assembly 90 includes a mounting plate 91 secured to the housing 50. A stub shaft 92 is carried by the mounting plate 91. An L-shaped control lever 93 is pivotally mounted on the stub shaft 92. The lever 93 has a relatively long, rearwardly extending leg 94 which serves as a handle. The lever 93 has a relatively short, forwardly extending leg 95. A hole 96 is formed through the short leg 95. The upper end region of the connection rod 83 is journaled in the hole 96.

By positioning the handle 94, an operator can position the diverter valve element 75 to proportion the flow of pressurized irrigation water from the supply hose 40 to the housing branches 52, 53. Rotating the handle 94 clockwise (as viewed in FIG. 4) will rotate the diverter valve element 75 toward a position where it fully closes the opening 72 and thereby cuts off the supply of pressurized water to the scroll of the turbine 30. With the handle 94 in this position, the turbine 30 does not operate to drive the winch drum 21. Rotating the handle 94 to position shown in FIG. 4 causes the diverter valve element 75 to close the opening 73 whereby the entire flow of pressurized water from the hose 40 is ducted through the turbine 30 before being exhausted into the housing branch 54. Moving the handle 94 to position the diverter valve member 75 at locations intermediate those where the openings 72, 73 are fully closed will cause a proportioning of pressurized irrigation water through the openings 72, 73.

A safety shutoff system is provided to terminate the supply of pressurized water to the turbine 30 when the unit 10 reaches the end of its cable path. Referring to FIG. 1, a cable guide tube 100 extends from the vicinity of the control lever assembly 90 forwardly toward the tongue 14. A pulley 101 is rotatably supported on the tongue 14. A safetly shutoff cable 102 extends loosely through the guide tube 100 and is reeved around the pulley 101. The cable 102 has a rearward end 104 which connects with the lever leg 95, and a forward end 105 which connects with a ring 106. The winch cable 22 extends loosely through the ring 106.

A shut-off member 107 is carried on the winch cable 22 at a location near the forward end of the winch cable 22. The shut-off member 107 has a diameter which will not pass through the ring 106. When the winch cable 22 is reeled in by the drum 21 to a position where the shut-off member 107 engages the ring 106, continued reeling of the winch cable 22 onto the drum 21 will cause tensioning of the safety shutoff cable 102. As the shutoff cable 102 is tensioned, it will pivot the control lever 93 clockwise (as viewed in FIG. 1) to a position where the diverter valve member 75 closes the turbine inlet supply opening 72. Once the opening 72 is closed, the turbine 30 ceases to drive the winch drum 21, and the unit 10 stops its movement.

Referring to FIGS. 3 and 4, the turbine 30 includes a housing 111, a cover 112, and a runner 113. The turbine housing 111 has an inlet portion 114 which is gasketed and secured to the diverter valve housing branch 52. The turbine housing has a central outlet portion 115 which is gasketed and secured to the diverter valve housing branch 54. The turbine housing has a cylindrical bore 116 that opens through the sidewall opposite the outlet portion 115 and that receives the runner 113. The cover 112 closes the open end of the bore 116 and journals the drive shaft 31. The runner 113 is supported on the drive shaft 31 for rotation within the bore 116.

Referring to FIGS. 5 – 9, the turbine housing 111 includes a scroll which defines a spiral chamber 120. The chamber 120 surrounds the runner 113 and decreases in cross section as it extends from the inlet portion 114. This construction helps assure that pressurized water admitted to the runner 113 enters the runner 113 at a substantially uniform velocity at all locations around the periphery of the runner 113.

Referring to FIGS. 4 and 5, the runner 113 includes a circular mounting portion 130, hub portion 131, and a plurality of curved vanes 132. The vanes 132 define an array of converging channels which duct pressurized water from the scroll chamber 120 toward the hub portion 131. The hub portion 131 is of tapered configuration and operates to duct water from the vanes 132 through the outlet portion 115 and into the valve housing branch 54.

The components of the turbine 30 are configured such that its efficiency increases as travel speed of the unit 10 is slowed due to an increase in hose drag forces. By this arrangement, as the travel speed of the unit 10 tends to slow, the turbine increases its output torque and prevents travel speed from slowing unduly.

In operation, the speed of travel of the unit 10 is determined both by the ratio of input and output speeds set in the transmission 32, and by the proportion of waterflow which is ducted through the turbine 30.

These transmission and water flow ratios must be individually determined for each sprinkler installation due to such variables as water pressure, terrain, and the quantity of irrigation water to be applied. A feature of providing speed control through these two types of control ratios is that a desired, constant travel speed setting can be obtained for almost any sprinkling situation. If the unit is found to increase its speed as it moves along its cable path, this can be corrected by shifting the transmission to a higher gear and reducing the flow of water through the turbine. If the unit is found to decrease its travel speed during movement along a cable path, this is remedied by shifting to a lower gear and increasing the flow of water through the turbine.

Although the invention has been described in its preferred form with a certain degree of particularity, it is understood that the present disclosure of the preferred form has been made only by way of example and numerous changes in the details of construction and the combination and arrangement of parts may be resorted to without departing from the spirit and the scope of the invention as hereinafter claimed. It is intended that the patent shall cover, by suitable expression in the appended claims, whatever features of patentable novelty exist in the invention disclosed.

What is claimed is:

1. An irrigation apparatus, comprising:
   a. a frame supported on wheels with selected ones of the wheels being steerable to guide the movement of the apparatus;
   b. a winch carried on the frame and including a rotatably mounted cable drum and a cable, the cable having one portion secured to the drum and another portion extensible forwardly of the apparatus to define a path of travel to be followed by the apparatus;
   c. steering means carried on the frame for steering the apparatus along a path defined by a forwardly extending portion of the cable;
   d. water inlet means adapted for connection to a source of pressurized irrigation water;
   e. water sprinkler means for distributing irrigation water in a predetermined manner about the apparatus;
   f. a water powered radial inflow turbine including housing structure having inlet and outlet portions, a drive shaft journaled by the housing structure, and a vaned runner carried on the drive shaft for rotation therewith, the drive shaft being drivingly connected to the cable drum to rotate the cable drum and reel in the forwardly extending cable portion in response to a supply of pressurized water to the turbine;
   g. flow control means communicating the inlet means, the sprinkler means and the turbine, and including a member which is movable to control the proportion of pressurized water which is supplied directly to the sprinkler means and which passes through the turbine before being supplied to the sprinkler means;
   h. the housing inlet portion defining an inlet scroll for admitting water at substantially uniform velocity to the periphery of the vaned runner, the inlet scroll having an inlet chamber which diminishes in cross-section as it extends circumferentially around the vaned runner.

2. The apparatus of claim 1 wherein the flow control means includes:
   a. a valve housing having three intersecting conduit defining branches, one of the branches communicating with the inlet means for ducting pressurized fluid into the valve housing to the branch intersection, another of the branches communicating with the turbine inlet portion for ducting water from the branch intersection to the turbine, and the remaining branch communicating with the sprinkler means and with the turbine outlet portion for ducting water from the branch intersection and from the turbine to the sprinkler means; and,
   b. a valve member supported at the branch intersection for movement between positions where it operates to proportion the flow of pressurized water which enters the another and remaining branches.

3. The apparatus of claim 2 wherein:
   a. the valve housing has a curved wall which defines a valve chamber at the branch intersection;
   b. the another and remaining branches have inlet openings which open into the valve chamber through the curved wall; and
   c. the valve member has a curved peripheral surface that is movable between positions where portions of the inlet openings are selectively blocked.

4. The apparatus of claim 1 additionally including positioning means connected to the movable member for positioning the movable member in selected positions to selectively proportion flow between the another and remaining branches.

5. The apparatus of claim 4 wherein:
   a. the movable member is movable to a shut-off position where substantially no pressurized water is admitted to the another branch; and,
   b. the positioning means includes safety means for moving the movable member to its shut-off position when the apparatus nears the end of a travel path defined by the forwardly extending cable portion.

6. The apparatus of claim 1 additionally including a variable ratio transmission means interposed between and drivingly connecting the turbine drive shaft and the cable drum.

7. An irrigation apparatus, comprising:
   a. a frame supported on wheels with selected ones of the wheels being steerable to guide the movement of the apparatus;
   b. a winch carried on the frame and including a rotatably mounted cable drum and a cable, the cable having one portion secured to the drum and another portion extensible forwardly of the apparatus to define a path of travel to be followed by the apparatus;
   c. steering means carried on the frame for steering the apparatus along a path defined by a forwardly extending portion of the cable;
   d. water inlet means adapted for connection to a source of pressurized irrigation water;
   e. water sprinkler means for distributing irrigation water in a predetermined manner about the apparatus;
   f. a water powered radial inflow turbine including housing structure, a drive shaft journaled by the housing structure, and a vaned runner carried on the drive shaft for rotation therewith in response to a supply of pressurized water to the turbine;
   g. variable ratio transmission means drivingly connecting the turbine drive shaft and the cable drum, and providing a first means of controlling the speed of rotation of the cable drum; and h. flow control means communicating the inlet means, the sprinkler means, and the turbine and including a member which is movable to control the proportion of pressurized water which is supplied directly to the sprinkler means and which passes through the turbine before being supplied to the sprinkler means, the member providing a second means of controlling the speed of rotation of the cable drum.

8. The apparatus of claim 7 wherein the turbine housing has an inlet portion that communicates with the flow control means to receive pressurized water therefrom, and the inlet portion defines an inlet scroll for admitting water at substantially uniform velocity to the periphery of the vaned runner, the inlet scroll having an inlet chamber which diminishes in cross-section as it extends circumferentially around the vaned runner.

9. The apparatus of claim 7 wherein:
a. the turbine housing structure has inlet and outlet portions; and
b. the flow control means includes:
 i. a valve housing having three intersecting conduit defining branches, one of the branches communicating with the inlet means for ducting pressurized fluid into the valve housing to the branch intersection, another of the branches communicating with the turbine inlet portion for ducting water from the branch intersection to the turbine, and the remaining branch communicating with the sprinkler means and with the turbine outlet portion for ducting water from the branch intersection and from the turbine to the sprinkler means; and,
 ii. a valve member supported at the branch intersection for movement between positions where it operates to proportion the flow of pressurized water which enters the another and remaining branches.

10. The apparatus of claim 9 wherein:
a. the valve housing has a curved wall which defines a valve chamber at the branch intersection;
b. the another and remaining branches have inlet openings which open into the valve chamber through the curved wall; and
c. the valve member has a curved peripheral surface that is movable between positions where portions of the inlet openings are selectively blocked.

11. The apparatus of claim 7 additionally including positioning means connected to the movable member for positioning the movable member in selected positions to selectively proportion flow between the another and remaining branches.

12. The apparatus of claim 11 wherein:
a. the movable member is movable to a shut-off position where substantially no pressurized water is admitted to the another branch; and,
b. the positioning means includes safety means for moving the movable member to its shut-off position when the apparatus nears the end of a travel path defined by the forwardly extending cable portion.

* * * * *